(12) United States Patent
Fujimori et al.

(10) Patent No.: US 6,185,052 B1
(45) Date of Patent: Feb. 6, 2001

(54) OPTICAL COMPONENT HOUSING, AND PROJECTOR USING THE SAME

(75) Inventors: Motoyuki Fujimori, Suwa; Atsuki Takei, Okaya; Tatsuto Hirabayashi, Akashima-Machi, all of (JP)

(73) Assignee: Seiko Epson Corporation, Tokyo (JP)

( * ) Notice: Under 35 U.S.C. 154(b), the term of this patent shall be extended for 0 days.

(21) Appl. No.: 09/409,390

(22) Filed: Sep. 30, 1999

(30) Foreign Application Priority Data

Oct. 1, 1998 (JP) .................................................. 10-280215

(51) Int. Cl.[7] .............................. G02B 7/02; G03B 21/00; G02F 1/1333
(52) U.S. Cl. ........................... 359/819; 359/811; 353/122; 349/58
(58) Field of Search ..................................... 359/819, 811, 359/821, 637; 353/61, 122; 348/58

(56) References Cited

U.S. PATENT DOCUMENTS 5,951,136 * 9/1999 Furuhata et al. ......................... 353/31
6,056,407 * 5/2000 Iinuma et al. ......................... 353/119

FOREIGN PATENT DOCUMENTS 10-336552  12/1998  (JP) .

\* cited by examiner

Primary Examiner—Georgia Epps
Assistant Examiner—Saeed Seyfari
(74) Attorney, Agent, or Firm—Oliff & Berridge, PLC

(57) ABSTRACT

An optical component housing is provided which is easy to form and in which dimensional accuracy of an optical component positioning portion is easily ensured. The optical component housing for housing an optical component constituting an optical system is made of metal and has an optical component positioning portion for positioning an optical component. The optical component positioning portion is formed by thixomolding using a metal material, and includes first support portions for supporting the light incident surface or the light emitting surface of the optical component. A portion of a side plate in contact with the first support portions is provided with portions previously removed that are formed by inserting inserts in a mold. Since the previously removed portions are formed before upper and lower molds of the mold are opened during molding, it is possible to prevent the optical component positioning portion from clinging to the mold, and to ensure dimensional accuracy of the optical component positioning portion.

18 Claims, 12 Drawing Sheets

OPTICAL COMPONENT HOUSING, AND PROJECTOR USING THE SAME

BACKGROUND OF THE INVENTION

1. Field of Invention

The present invention relates to an optical component housing made of metal to hold optical components that constitute an optical system, and to a projection display device using the optical component housing.

2. Description of Related Art

Hitherto, a projection display device has been used which may consist of a light source, an optical unit for forming an optical unit by modulating a light beam emitted from the light source according to image information, and a projection lens for enlarging and projecting the modulated light beam onto a projection plane. The optical unit includes an illumination optical system for uniformizing the in-plane illumination distribution of a light beam emitted from the light source, a color separation optical system for separating the light beam from the illumination optical system into color beams of the primary colors, red, blue, and green, an optical modulation system for modulating the color beams according to image information, and a color synthesizing optical system for synthesizing the modulated color beams.

Optical components, such as dichroic mirrors for constituting the color separation optical system, and condenser lenses placed on the incident side of the optical modulation device, are usually housed in an optical component housing, called a "light guide", because they need to be precisely placed on the optical axis extending from the light source to the projection lens. The adoption of an optical component housing made of metal, such as a magnesium alloy, as such an optical component housing has been examined. When the optical component housing made of metal is adopted in the projection display device, since the strength of the material is high, it is reduced in thickness, thereby reducing the weight of the device. Since a metal having high thermal conductivity is adopted as the material, it is possible to improve efficiency in cooling various optical components housed therein.

In addition to molding methods, such as casting and forging, thixomolding is known as a method of producing the above-described optical component housing made of metal, in which injection molding is performed using semi-molten metal consisting of coexisting solid and liquid phases, by agitating the semi-molten metal and thereby lowering the viscosity thereof.

According to this thixomolding method, since an injected material can be molded at a lower temperature than in casting, such as die casting, less shrinkage occurs due to solidification by cooling, and it is easy to ensure dimensional accuracy. Moreover, since the surface of a molded article is close, it is possible to simplify subsequent processes such as buffing.

SUMMARY OF THE INVENTION

The optical component housing may consist of, however, a box-shaped section for covering the bottom, side, and top portions of the optical components, so as to prevent the entry of dust and the like, and optical component positioning portions for precisely positioning the optical components. Since the optical component positioning portions must precisely place the optical components along the axis parallel to the light traveling direction, high dimensional accuracy is required. Therefore, in a case in which the optical component positioning portions are formed by thixomolding, problems arise in that molding is difficult and in that it is difficult to ensure accuracy, which substantially increases the production cost of the optical component housing.

An object of the present invention is to provide an easy-to-form structure, which allows dimensional accuracy to be high, for an optical component housing in which at least an optical component positioning portion is formed by thixomolding using metal material. Another object of the present invention is to provide a projection display device in which the production cost can be reduced by using an optical component housing having such a structure.

In order to achieve the above objects, an optical component housing of the present invention is an optical component housing formed by thixomolding using a metal material, and having an optical component positioning portion, the optical component positioning portion may include a first side plate and a second side plate that form a predetermined angle, a first support portion that supports one of a light incident surface and a light emitting surface of the optical component, and a second support portion that supports a peripheral edge portion of the optical component, the first support portion projecting on an inner side face of the first side plate so as to be in contact with the second side plate, and a portion of the second side plate in contact with the first support portion having a portion previously removed that is formed by inserting an insert in a mold used in the thixomolding.

A portion for positioning an optical component is generally shaped to be thin-walled and tall. Moreover, since the surface in contact with the optical component must be provided with a draft of 0°, the positioning portion clings to the mold and cannot be separated from the mold after molding. If demolding is forcibly performed, the optical component is deformed, or the thin-walled positioning portion is broken at the middle point thereof. Since the optical component positioning portion has a previously removed portion that is formed from an insert, and the previously removed portion is formed before an upper mold and a lower mold are opened, the positioning portion can be prevented from clinging to the mold. Accordingly, it is possible to form the optical component positioning portion with high precision. Therefore, it is possible to easily and precisely produce the optical component housing, to improve the quality of molding of the optical component housing, and to substantially reduce the production cost.

In the above, it is preferable that the above-described previously removed portion be formed of a recess formed in the other side plate. That is, since the previously removed portion is formed of a recess, even when an alloy slurry enters the clearance between the insert and the casting mold, and casting fins or the like are thereby produced in the portion of the second side plate in contact with the first support portion, the casting fins can be absorbed by the recess. Therefore, it is possible to simplify operations for removing the casting fins, and to thereby further reduce the production cost of the optical component housing.

Preferably, the planar shape of the recess is at least one of a substantially cross-shape, a substantially T-shape, a substantially L-shape, a substantially concave shape, and a substantially convex shape, or a combination thereof.

That is, since the insert in the previously removed portion is narrow and long and does not have a guide at the leading end, it is apt to be tilted due to the pressure of molten metal during molding, and furthermore, it is apt to be distorted due to the pressure of the molten metal. Therefore, the recess is formed in the above planar shape to provide resistance to tilting, and is engaged with a guide portion of the insert to limit the tilting. This also makes it possible to improve rigidity of the insert against distortion, and to improve and stabilize molding accuracy.

Furthermore, in the above-described optical component housing, a plate-like member may be attached to the optical component positioning portion. The plate-like member can be attached to the optical component positioning portion by, for example, welding, screwing, or riveting.

That is, since the optical component housing is constructed by attaching the plate-like member to the optical component positioning portion, it can be formed by molding a skeletal portion, which requires high dimensional accuracy, by thixomolding, and by subsequently attaching a plate-like member. Therefore, the structure of the mold in thixomolding is simplified, and it is easier to ensure dimensional accuracy. In addition, thixomolding can also be performed more rapidly and at lower cost by forging or the like besides injection molding.

The above-described optical component housing may be constructed by attaching an optical component positioning member, which constitutes the optical component positioning portion, to the inside of a box-shaped member.

That is, when the optical component housing is thus constructed, it is possible to provide operations and advantages similar to those in the case in which the optical component housing is constructed with a plate-like member attached thereto. Moreover, since the optical component is housed inside the box-shaped member, it is possible to reliably prevent dust entering from the outside from adhering to the optical component.

Furthermore, an optical component housing of the present invention is an optical component housing formed by thixomolding using a metal material, and having an optical component positioning portion, wherein the optical component positioning portion includes first and second side plates that form a predetermined angle, a first support portion for supporting the light incident surface or the light emitting surface of the optical component, and a second support portion for supporting the peripheral edge portion of the optical component, wherein the first support portion projects on the inner side face of the first side plate so as to be in contact with the second side plate, and wherein a portion of the second side plate in contact with the first support portion has a recess.

According to the present invention, when the recess is formed by a previously removed structure in which an insert is inserted in a casting mold, even if an alloy slurry enters the clearance between the insert and the casting mold, and casting fins or the like are thereby produced in the portion of the second side plate in contact with the first support portion, the casting fins or the like can be absorbed by the recess, which makes it possible to provide operations and advantages similar to the above-described operations and advantages.

Furthermore, the optical component housing may have a structure in which the planar shape of the recess is a substantially cross-shape, a substantially T-shape, or a combination thereof, in which a plate-like member is attached to the optical component positioning portion, and in which the optical component positioning member is mounted inside a box-shaped member. This makes it possible to provide operations and advantages similar to the above-described operations and advantages.

According to a projection display device equipped with the above-described optical component housing, it is possible to reduce the production cost, to increase accuracy of placement of optical components, to improve efficiency in cooling the optical components, and to reduce the weight of the device associated with weight reduction of the optical component housing.

DETAILED DESCRIPTION OF PREFERRED EMBODIMENTS

An embodiment of the present invention will be described below with reference to the drawings.

Figure 1:
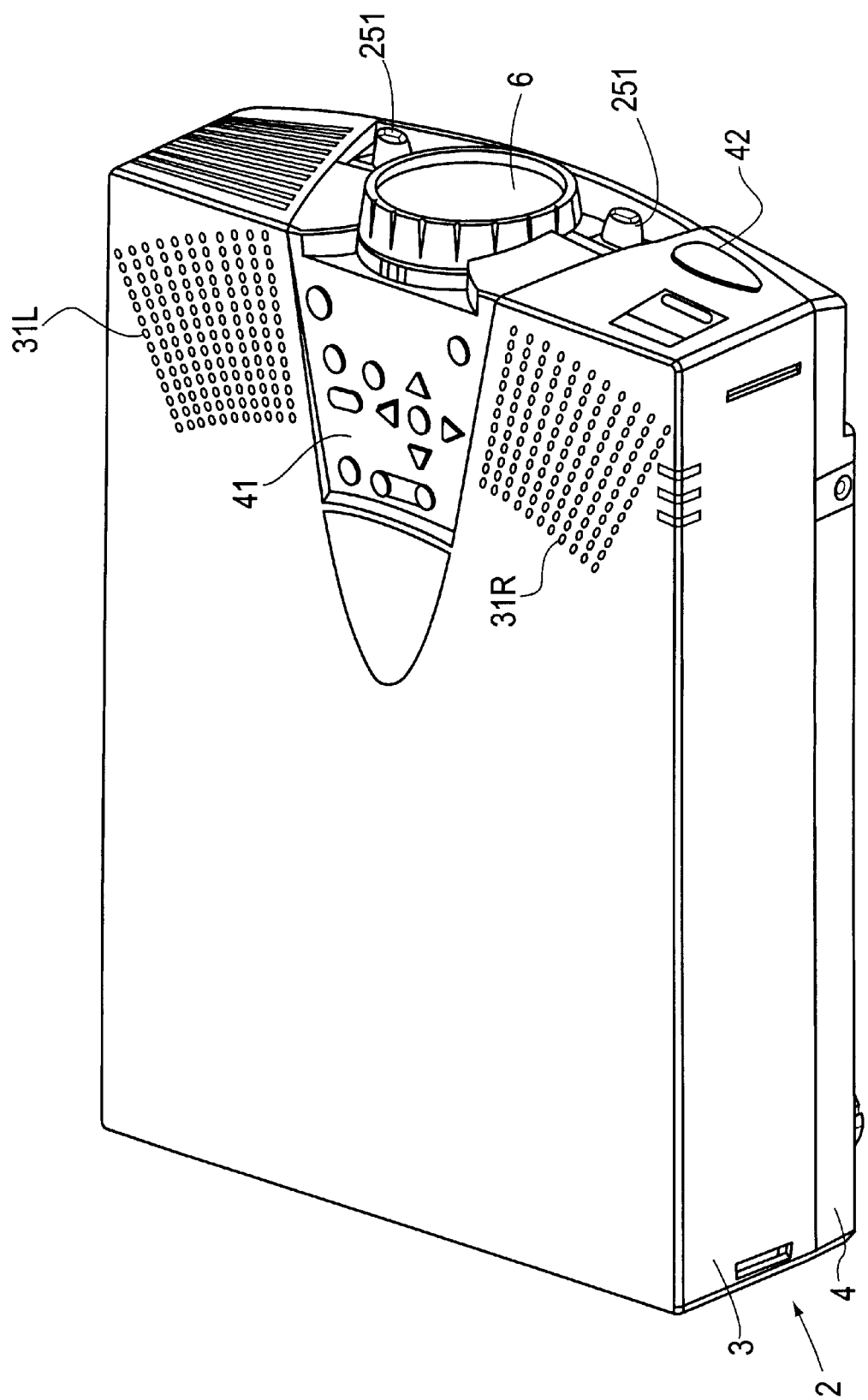
FIG. 1 is an external perspective view of a projection display device according to an embodiment of the present invention, as viewed from the top side thereof.
Figure 2:
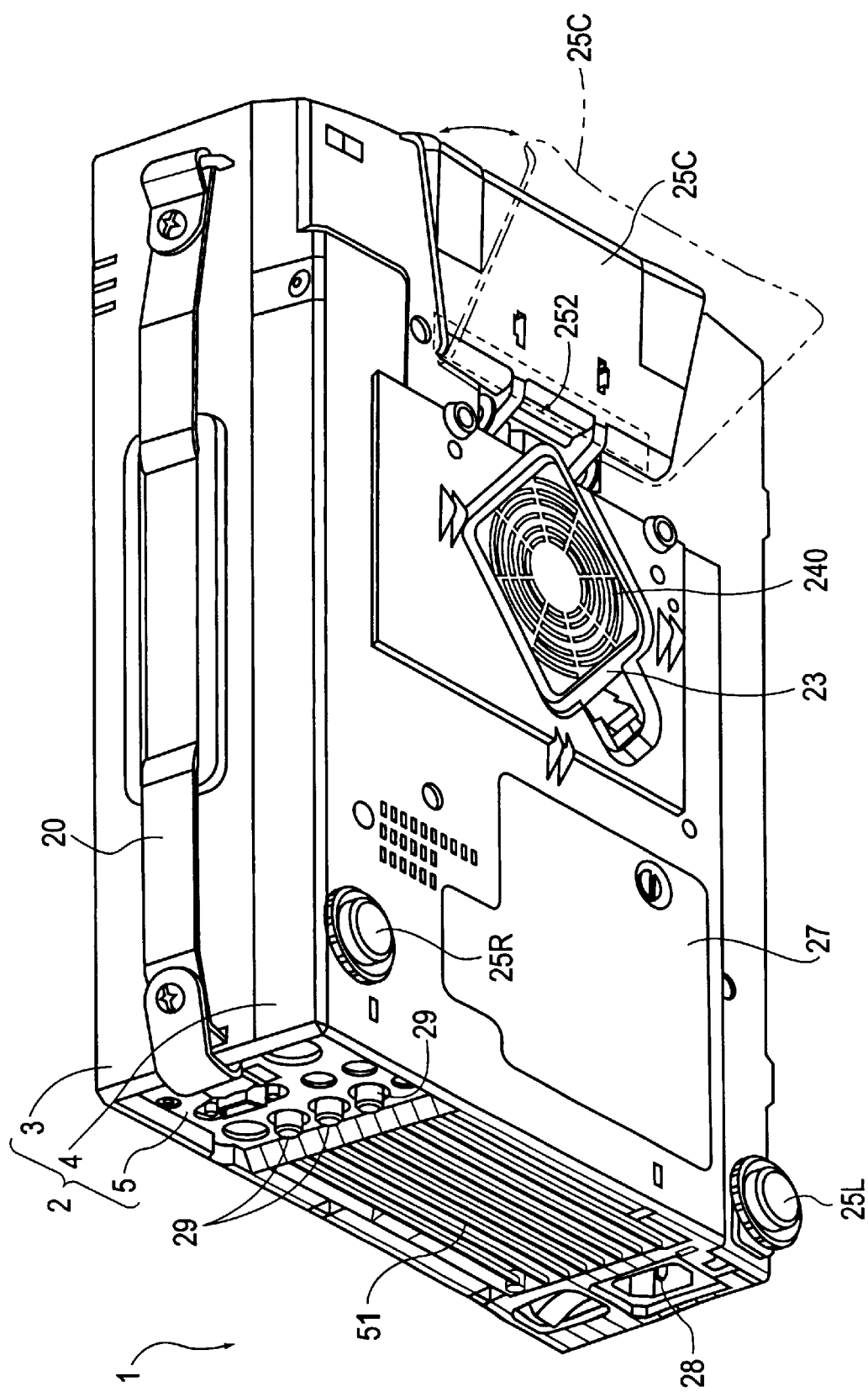
FIG. 2 is an external perspective view of the projection display device in the embodiment, as viewed from the bottom side thereof.

FIGS. 1 and 2 are schematic perspective views of a projection display device 1 according to this embodiment. FIG. 1 is a perspective view, as viewed from the top side, and FIG. 2 is a perspective view, as viewed from the bottom side.

The projection display device 1 is of the type that separates a light beam emitted from a light-source lamp into beams of the three primary colors, red (R), green (G), and blue (B), modulates these color light beams via liquid crystal panels (modulation system) according to image information, synthesizes the modulated color light beams by a prism (color synthesizing optical system), and enlarges and projects the synthesized light beams onto a projection plane via a projection lens 6. The components excluding a part of the projection lens 6 are housed inside an outer case 2.

The outer case 2 may basically consist of an upper case 3 for covering the top face of the device, a lower case 4 for forming the bottom face of the device, and a rear case 5 (FIG. 2) for covering the rear face.

As shown in FIG. 1, many communication holes 31R and 31L are formed at the right and left front ends of the top face of the upper case 3. Between these communication holes 31R and 31L, control switches 41 are disposed to control image quality, focus, and the like of the projection display device 1. Furthermore, a light receiving portion 42 is provided at the left bottom of the front face of the upper case 3 so as to receive an optical signal from a remote control that is not shown. A handle 20 for carrying is detachably mounted on the side face of the upper case 3 (see FIG. 2).

As shown in FIG. 2, the bottom face of the lower case 4 is provided with a lamp replacement cover 27 through which a light-source lamp unit 8 (which will be described later) held inside is replaced, and an air filter cover 23 having an air inlet 240 for cooling the inside of the device.

The bottom face of the lower case 4 is also provided, as shown in FIG. 2, with a foot 25C at about the front center end, and feet 25R and 25L at the right and left rear corners. The foot 25C is turned via a turning mechanism 252 (FIG. 2) disposed on its rear side by raising levers 251 shown in FIG. 1, and is urged into an open state in which it is separated on its front side from the main body of the device, as shown by a double-dotted chain line in FIG. 2. By controlling the amount of turn, the vertical position of a display screen on the projection plane can be changed. In contrast, the feet 25R and 25L are extended or retracted in the projecting direction by being turned. By controlling the amount of extension or retraction, the inclination of the display screen can be changed.

In the rear case 5, as shown in FIG. 2, an AC inlet 28 for external power supply, and a group of various kinds of input-output terminals 29 are arranged. An air outlet 51 is formed adjacent to these input-output terminals 29 so as to exhaust air inside the device therethrough.

Figure 3:
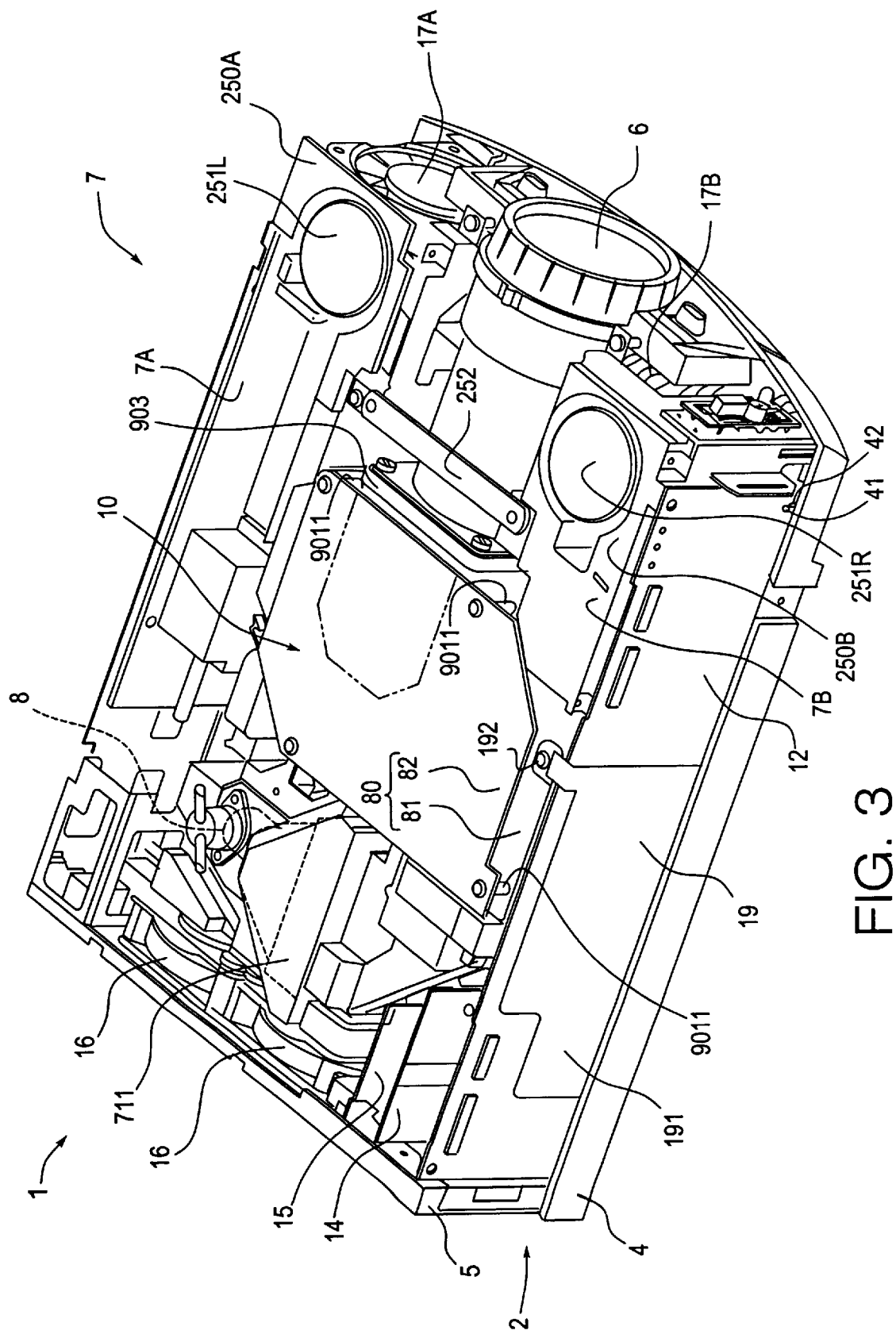
FIG. 3 is a perspective view showing the inner configuration of the projection display device of the embodiment.
Figure 4:
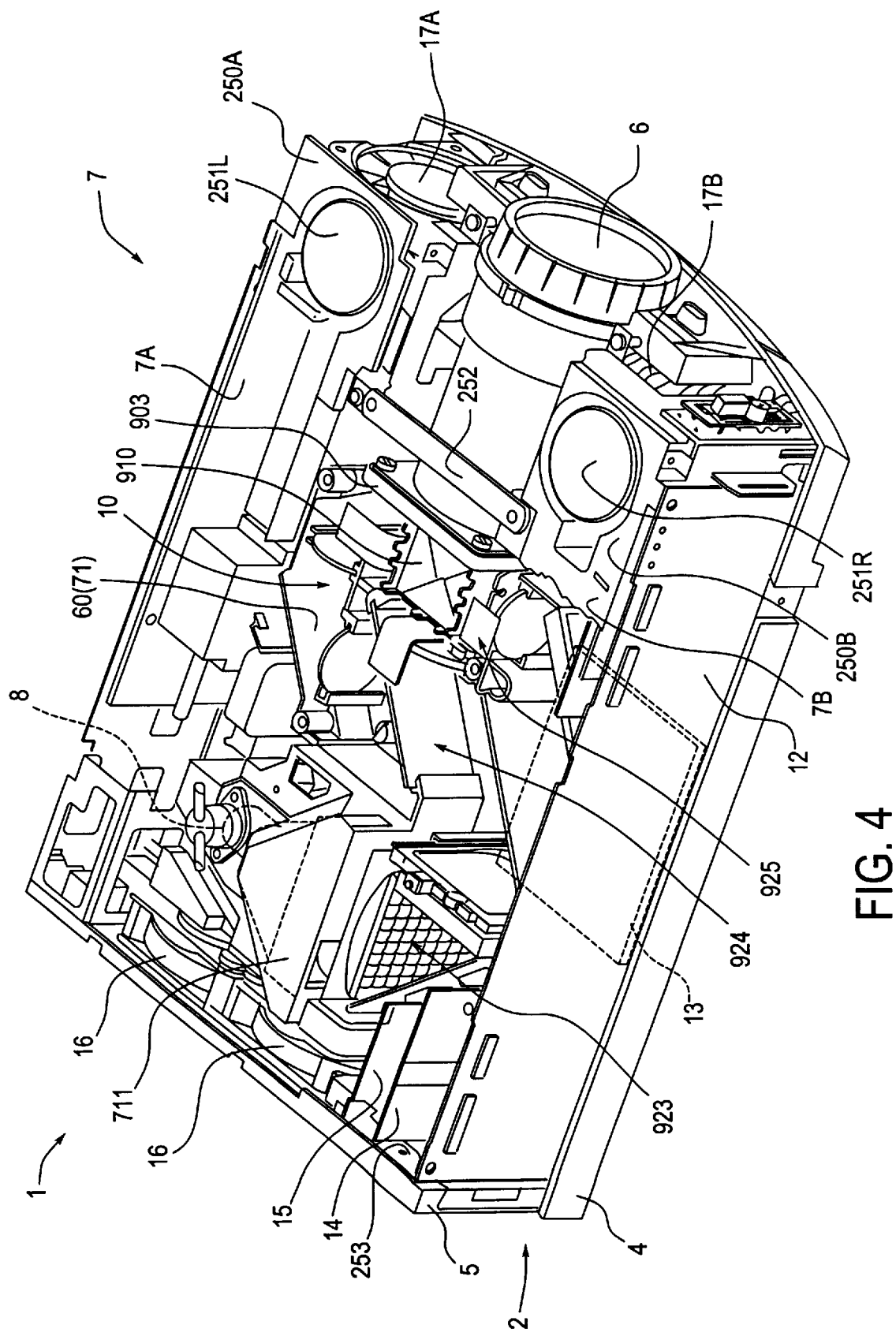
FIG. 4 is a perspective view of an optical system inside the projection display device of the embodiment.
Figure 5:
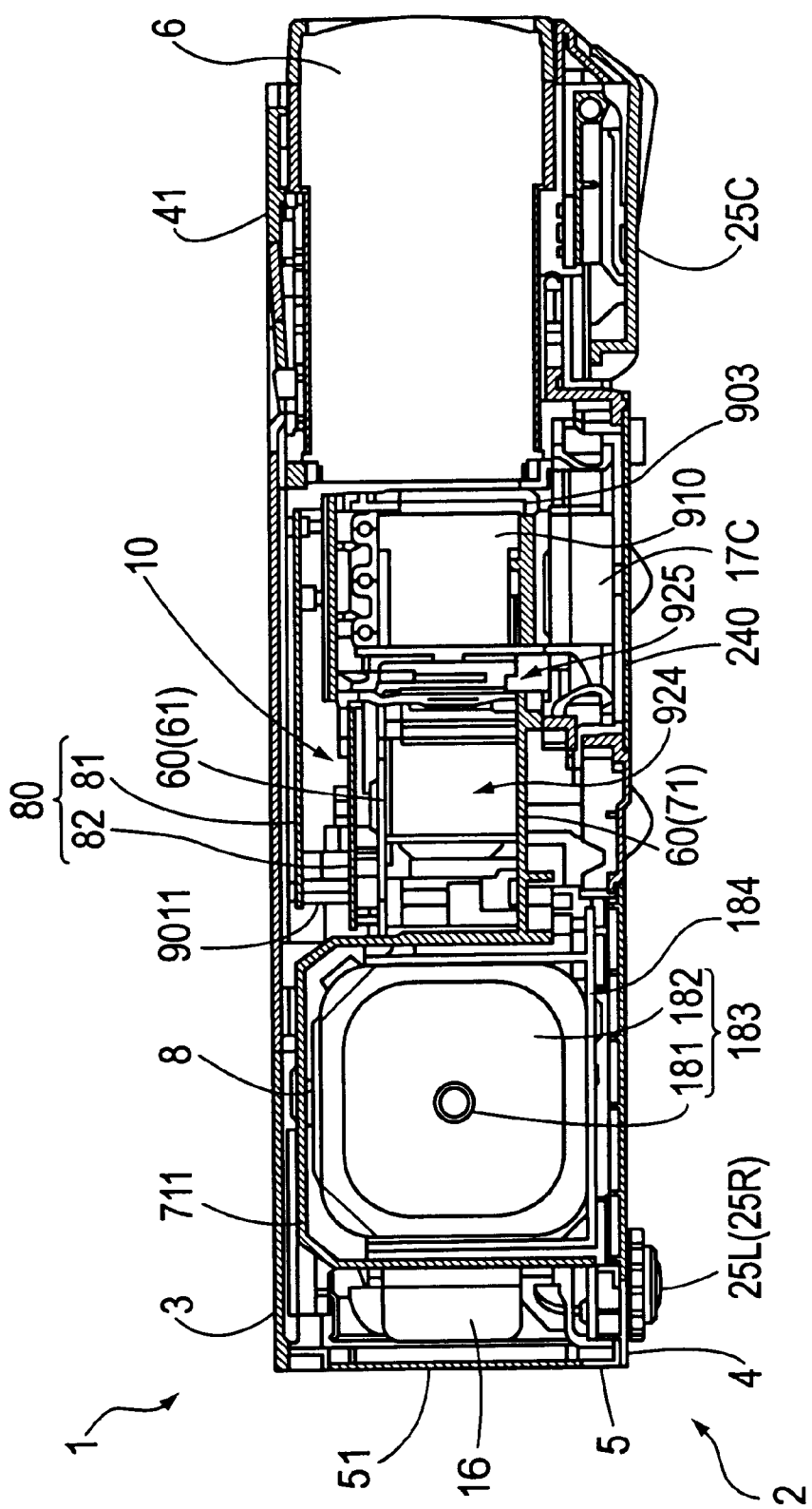
FIG. 5 is a vertical sectional view showing the inner configuration of the projection display device of the embodiment.

FIGS. 3 to 5 show the inner configuration of the projection display device 1. FIGS. 3 and 4 are schematic perspective views showing the inside of the device, and FIG. 5 is a vertical sectional view of the projection display device 1.

As these figures show, a power supply unit 7 serving as a power supply, the light-source lamp unit 8, an optical unit 10 forming an optical system, a driver board 80 composed of two circuit boards and serving as an optical modulation device driving means, a main board 12, and the like are arranged inside the outer case 2.

The power supply unit 7 is composed of first and second power supply blocks 7A and 7B disposed on both sides of the projection lens 6. The first power supply block 7A transforms electric power obtained via the AC inlet 28, and mainly supplies the power to the second power supply block 7B and the light-source lamp unit 8. The first power supply block 7A may consist of a transformer, a rectifier circuit, a smoothing circuit, a voltage stabilizing circuit, and the like. The second power supply block 7B further transforms and supplies the electric power obtained from the first power supply block 7A, and may consist of various circuits as well as a transformer, in a manner similar to the first power supply block 7A. The electric power is supplied to a power-supply circuit substrate 13 (shown by a dotted line in FIG. 4) disposed below the optical unit 10, and first and second intake fans 17A and 17B placed adjacent to the respective power supply blocks 7A and 7B. A power-supply circuit on the power-supply circuit board 13 mainly generates electric power for driving a control circuit on the main board 12 based on the electric power from the second power supply block 7B, and also generates electric power for other low-power components. The second intake fan 17B is disposed between the second power supply block 7B and the projection lens 6 so as to draw cooling air from the outside into the inside through a clearance formed between the projection lens 6 and the upper case 3 (FIG. 1). The power supply blocks 7A and 7B include conductive cover members 250A and 250B made of aluminum or the like, respectively. The respective cover members 250A and 250B are provided with speakers 251L and 251R for voice output at the positions corresponding to the communication holes 31L and 31R formed in the upper case 3.

The light-source lamp unit 8 constitutes a light-source section of the projection display device 1, and may consist of a light-source device 183 including a light-source lamp 181 and a reflector 182, and a lamp housing 184 for housing the light-source device 183. Such a light-source lamp unit 8 is covered with a lamp housing portion 711 that is formed integrally with a lower light guide 71 (FIG. 5), and is structured so that it can be detached from the above-described lamp replacement cover 27. In the rear of the lamp housing portion 711, a pair of exhaust fans 16 are arranged on the right and left sides at the positions corresponding to the air outlet 51 of the rear case 5. These exhaust fans 16 lead cooling air drawn by the first to third intake fans 17A to 17C into the lamp housing portion 711 from an opening formed adjacent thereto, cool the light-source lamp unit 8 by this cooling air, and then exhaust the cooling air from the air outlet 51. Electric power is supplied to the exhaust fans 16 from the power-supply circuit board 13.

The optical unit 10 is a unit that forms an optical image corresponding to image information by optically processing a light beam emitted from the light-source lamp unit 8, and may consist of an illumination optical system 923, a color separation optical system 924, a modulation system 925, and a prism unit 910 serving as a color synthesizing optical system. The optical elements in the optical unit 10 other than the modulation system 925 and the prism unit 910 are contained inside a light guide 60 that serves as a housing for optical components. The optical components constituting the illumination optical system 923, the color separation optical system 924, etc. are fixed by fixing the light guide 60 to the lower case 4 by screws.

Figure 6:
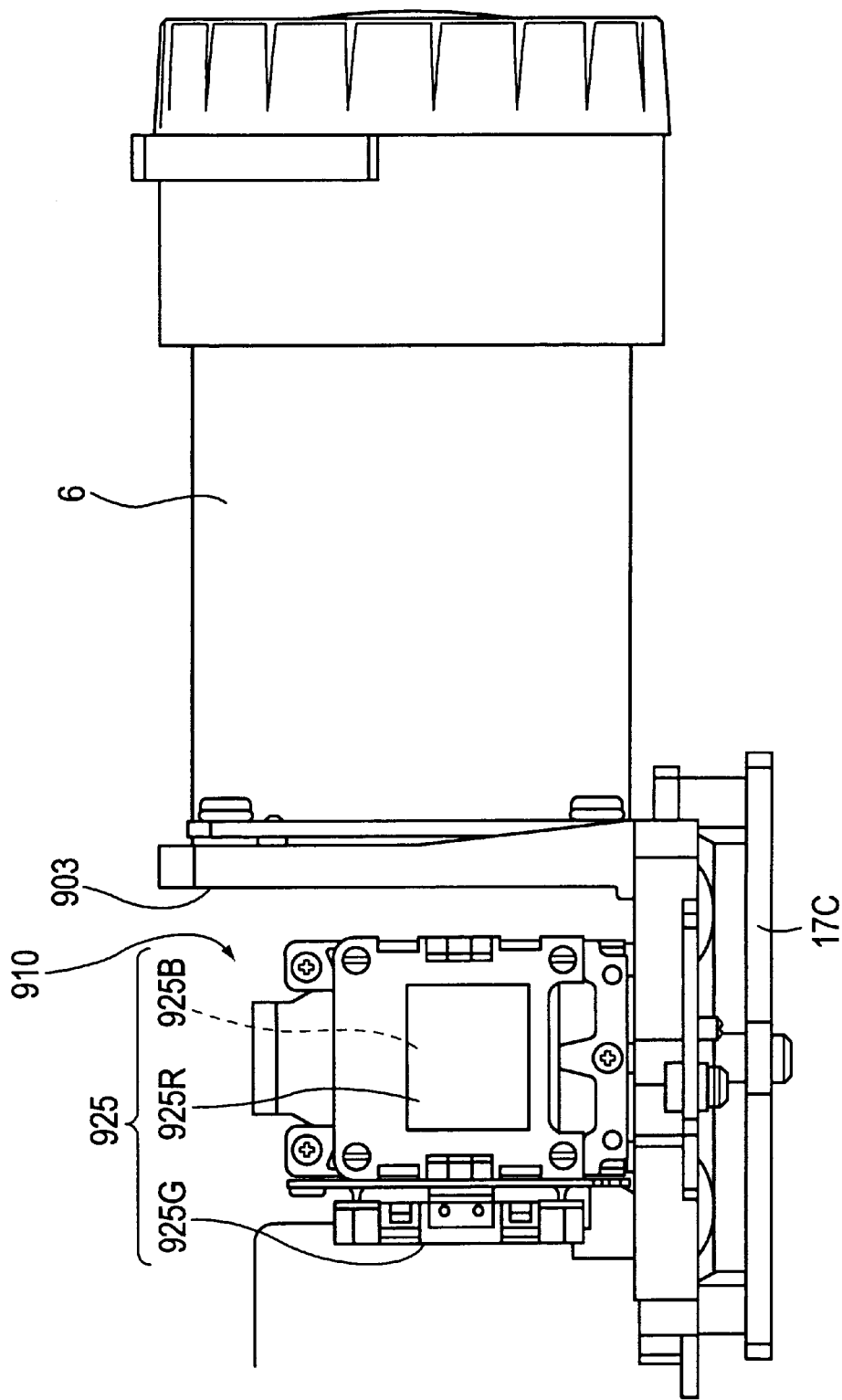
FIG. 6 is a vertical sectional view showing a head member having a modulation device, a color synthesizing optical system, and a projection lens mounted thereon in the embodiment.

The prism unit 910 in the shape of a rectangular parallelepiped is fixed by fixing screws to the back side of a head member 903 that is a structure formed of an integrally molded piece of magnesium and having a substantially L-shaped profile, as shown in FIG. 6. Liquid crystal panels 925R, 925G, and 925B, which constitute the modulation system 925, are placed to face three side faces of the prism unit 910, and are similarly fixed to the head member 903 by fixing screws. The liquid crystal panel 925B is positioned to be opposed to the liquid crystal panel 925R across the prism unit 910 (FIG. 7), and only a leader line (dotted line) and a reference numeral thereof are shown in FIG. 6. These liquid crystal panels 925R, 925G, and 925B are cooled by cooling air from a third intake fan 17C that is placed on the lower surface of the head member 903 corresponding to the above-described air inlet 240. In this case, electric power for the third intake fan 17C is supplied from the power-supply circuit board 13 via the driver board 80. Furthermore, the base end of the projection lens 6 is similarly fixed to the front face of the head member 903 by fixing screws. The head member 903, which is thus equipped with the prism unit 910, the modulation system 925, and the projection lens 6, is fixed to the lower case 4 by fixing screws, as shown in FIG. 5.

The driver board 80 serves to control of the drive of the respective liquid crystal panels 925R, 925G, and 925B in the modulation system 925 described above, and is composed of a separate setting substrate 81 and a common setting substrate 82 that will be described later. The separate setting substrate 81 and the common setting substrate 82 are laid one on top of another above the optical unit 10. The separate setting substrate 81 disposed at the lower position and the common setting substrate 82 are separated from each other via a stud bolt 9011, and have a plurality of circuit elements, which are not shown, for constituting a control circuit, mounted on the opposing surfaces thereof. Although not shown, the substrates 81 and 82 are electrically connected by a connector placed at corresponding positions on the opposing surfaces.

Cooling air drawn in by the above-described third intake fan 17C cools the liquid crystal panels 925R, 925G, and 925B, and is supplied to the space between the separate setting substrate 81 and the common setting substrate 82 so as to cool the circuit elements on the respective substrates 81 and 82.

The main board 12 is provided with a control circuit for controlling the overall projection display device 1, and stands on the side of the optical unit 10. Such a main board 12 is electrically connected to the driver board 80 and the control switches 41 described above, are electrically connected to an interface substrate 14 having the group of input-output terminals 29, and a video substrate 15, and is further connected to the power-supply circuit board 13 via a connector or the like. The control circuit of the main board 12 is driven by electric power generated by the power-supply circuit on the power-supply circuit substrate 13, that is, electric power from the second power supply block 7B. The main board 12 is cooled by cooling air that flows from the second intake fan 17B and passes through the second power supply block 7B.

In FIG. 3, a guard member 19 made of metal, such as aluminum, is interposed between the main board 12 and the outer case 2 (only the lower case 4 and the rear case 5 are shown in FIG. 3). The guard member 19 has a large planar portion 191 that spreads between the top and bottom ends of the main board 12, is fixed at the top to the cover member 250B of the second power supply block 7B by a fixing screw 192, and is engaged with and supported by, for example, a slit in the lower case 4 at the bottom. As a result, the upper case 3 (FIG. 1) and the main board 12 are prevented from interfering with each other in combining the upper case 3 with the lower case 4, and the main board 12 is protected from external noise.

Figure 7:
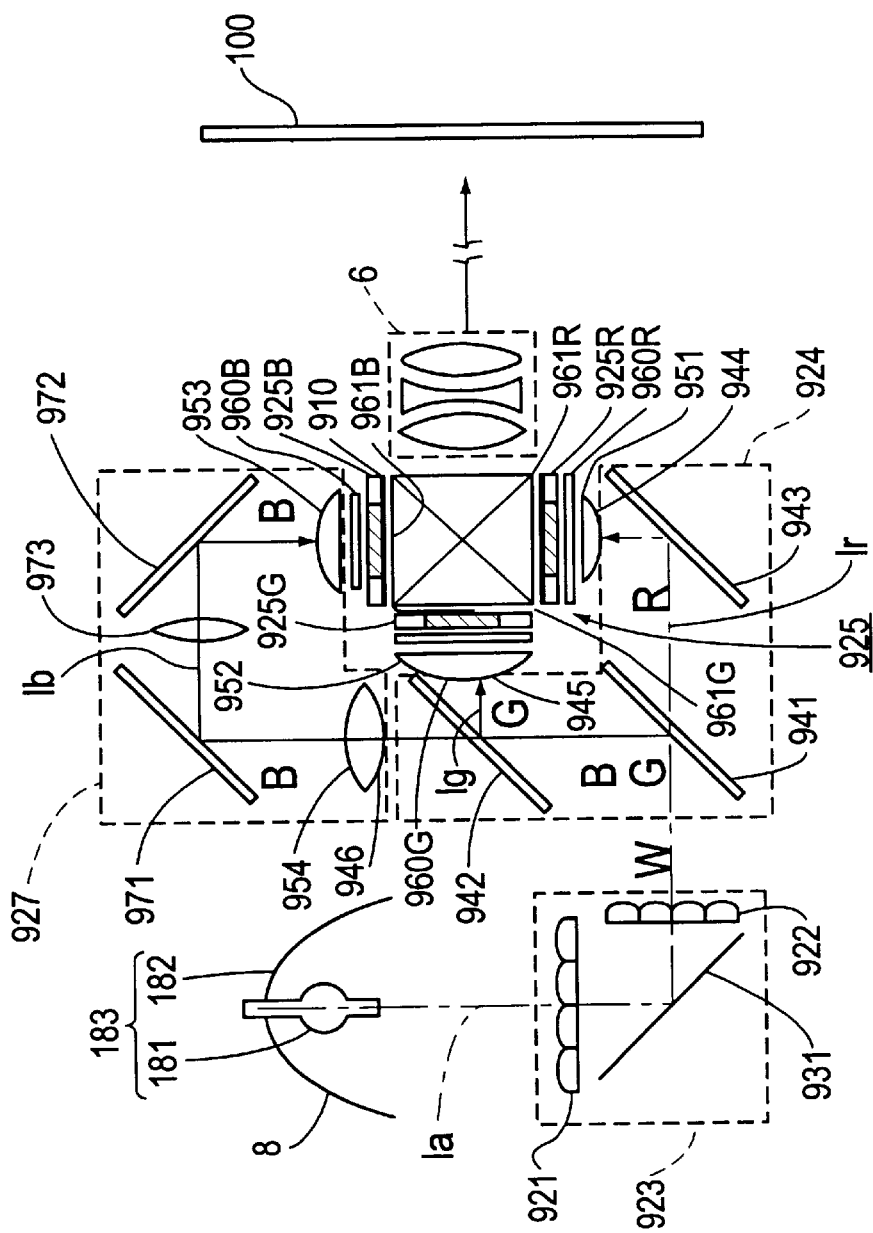
FIG. 7 is a schematic view illustrating the configuration of the optical system in the projection display device of the embodiment.

Next, the configuration of the optical system in the projection display device 1, i.e., the optical unit 10, will be described with reference to FIG. 7 as a schematic view.

As described above, the optical unit 10 may consist of the illumination optical system 923 for uniformizing the in-plane illumination distribution of a light beam (W) from the light-source lamp unit 8, the color separation optical system 924 for separating the light beam (W) from the illumination optical system 923 into red (R), green (G), and blue (B) beams, the modulation system 925 for modulating the color beams R, G, and B according to image information, and the prism unit 910 that serves as the color synthesizing optical system for synthesizing the modulated color beams.

The illumination optical system 923 includes a reflecting mirror 931 for bending an optical axis 1a of the light beam W emitted from the light-source lamp unit 8 toward the front of the device, and a first lens plate 921 and a second lens plate 922 disposed on both sides of the reflecting mirror 931.

The first lens plate 921 includes a plurality of rectangular lenses arranged in a matrix, splits the light beam emitted from the light source into a plurality of partial beams, and condenses the partial beams near the second lens plate 922.

The second lens plate 922 includes a plurality of rectangular lenses arranged in a matrix, and has the function of superimposing the partial beams emitted from the first lens plate 921 onto the liquid crystal panels 925R, 925G, and 925B (which will be described later) for constituting the modulation system 925.

In this way, since the liquid crystal panels 925R, 925G, and 925B can be illuminated with light having substantially uniform illuminance by the illumination optical system 923 in the projection display device 1 of this embodiment, it is possible to obtain a projection image having uniform illuminance.

The color separation optical system 924 may consist of a blue and green reflecting dichroic mirror 941, a green reflecting dichroic mirror 942, and a reflecting mirror 943. First, a blue beam B and a green beam G contained in the light beam W emitted from the illumination optical system 923 are perpendicularly reflected by the blue and green reflecting dichroic mirror 941, and travel toward the green reflecting dichroic mirror 942.

A red beam R passes through the blue and green reflecting dichroic mirror 941, is perpendicularly reflected by the reflecting mirror 943 disposed at the rear thereof, and emerges from an emitting portion 944 for the red beam R toward the prism unit 910. Next, only the green beam G of the blue and green beams B and G reflected by the blue and green reflecting dichroic mirror 941 is perpendicularly reflected by the green reflecting dichroic mirror 942, and emerges from an emitting portion 945 for the green beam G toward the prism unit 910. The blue beam B passed through the green reflecting dichroic mirror 942 emerges from an emitting portion 946 for the blue beam B toward a light guide system 927. In this embodiment, the distances from an emitting portion of the illumination optical system 923 for the light beam W to the emitting portions 944, 945, and 946 of the color separation optical system 924 for the color beams R, G, and B are set to be equal.

On the emitting sides of the emitting portions 944 and 945 of the color separation optical system 924 for the red and green beams R and G, condenser lenses 951 and 952 are disposed, respectively. Therefore, the red and green beams R and G emitted from the respective emitting portions enter these condenser lenses 951 and 952, where they are collimated.

The red and green beams R and G thus collimated pass through incident-side polarizers 960R and 960G, and enter the liquid crystal panels 925R and 925G, where they are modulated and given corresponding image information. That is, these liquid crystal panels 925R and 925G are subjected to switching control according to image information by the above-described driver board 80, thereby modulating the color beams passing therethrough. In contrast, the blue beam B is guided to the corresponding liquid crystal panel 925B via the light guide system 927, where it is similarly subjected to modulation according to image information. As the liquid crystal panels 925R, 925G, and 925B of this embodiment, for example, liquid crystal panels may be adopted that use a polysilicon TFT as a switching element.

The light guide system 927 may consist of a condenser lens 954 disposed on the emitting side of the emitting portion 946 for the blue beam B, an incident-side reflecting mirror 971, an emitting-side reflecting mirror 972, an intermediate lens 973 interposed between these reflecting mirrors, and a condenser lens 953 disposed before the liquid crystal panel 925B. The blue beam B emerging from the condenser lens 953 passes through an incident-side polarizer 960B, and enters the liquid crystal light panel 925B, where it undergoes modulation. In this case, the optical axis $1a$ of the light beam W and the optical axes $1r$, $1g$, and $1b$ of the respective color beams R, G, and B are formed in the same plane. The blue beam B has the longest one of the optical path lengths of the color beams, namely, the distances from the light-source lamp 181 to the respective liquid crystal panels. Therefore, this light beam undergoes the largest light loss. The light loss can, however, be reduced by interposing the light guide system 927.

Next, the respective color beams R, G, and B modulated through the liquid crystal panels 925R, 925G, and 925B pass through emitting-side polarizers 961R, 961G, and 961B, and enter the prism unit 910, where they are synthesized. A color image synthesized by the prism unit 910 is enlarged and projected via the projection lens 6 onto a projection plane 100 that is disposed at a predetermined position.

Figure 8:
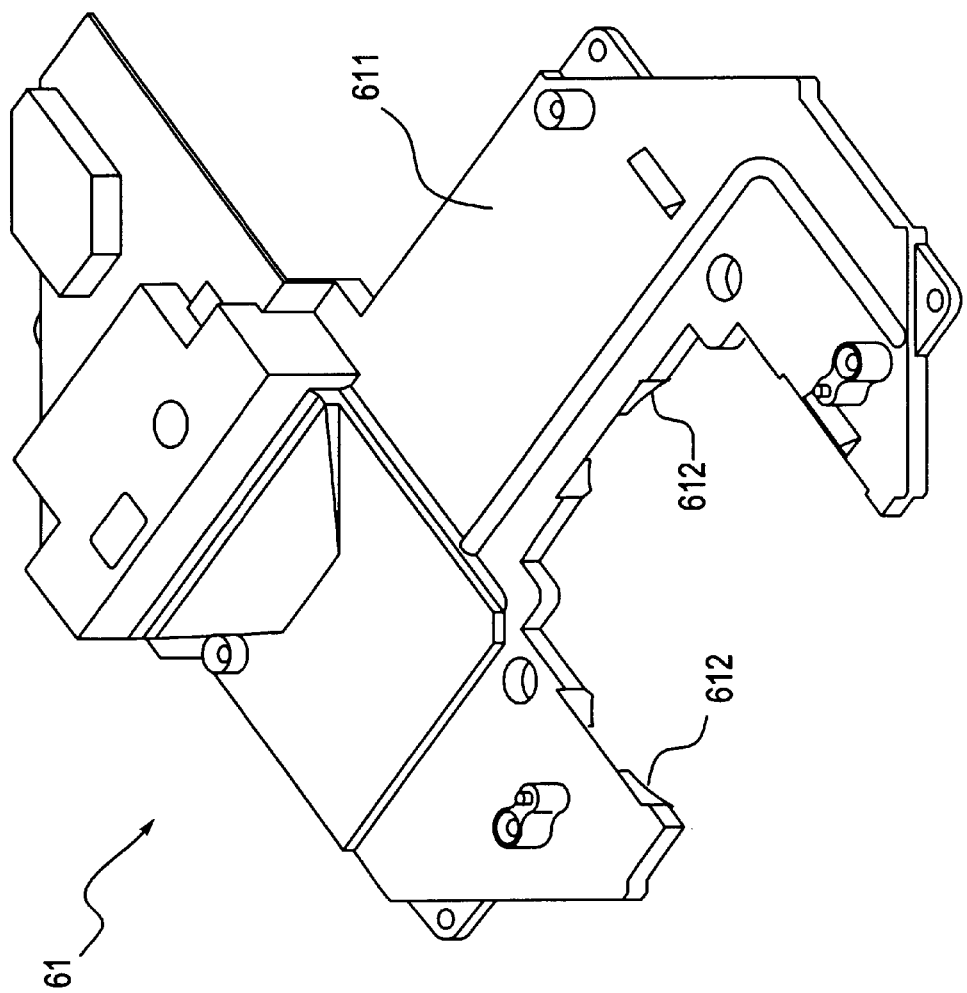
FIG. 8 is a schematic perspective view of an upper light guide that forms an optical component housing for constituting the projection display device of the embodiment.

The lens plates 921 and 922 of the illumination optical system 923, the dichroic mirrors 941 and 942 of the color separation optical system 924, and the condenser lenses 951 and 952, which constitute the optical system of the projection display device 1, are precisely positioned and housed inside the light guide 60 made of a magnesium alloy, as described above. The light guide 60 is composed of an upper light guide 61 shown in FIG. 8, and a lower light guide 71 shown in FIG. 9. The upper light guide 61 and the lower light guide 71 are engaged with each other so as to house the optical components, such as the lens plates 921 and 922, to prevent the entry of dust, and to fixedly clamp the optical components. As shown in FIG. 8, the upper light guide 61 includes a top plate 611 for covering the tops of the optical components, such as mirrors, lenses, and the like, which constitute the illumination optical system 923, the color separation optical system 924, and the light guide system 927, and clamp pieces 612 formed on the lower surface of the top plate 611 to hold the tops of the condenser lenses 951, 952, and 953.

Figure 9:
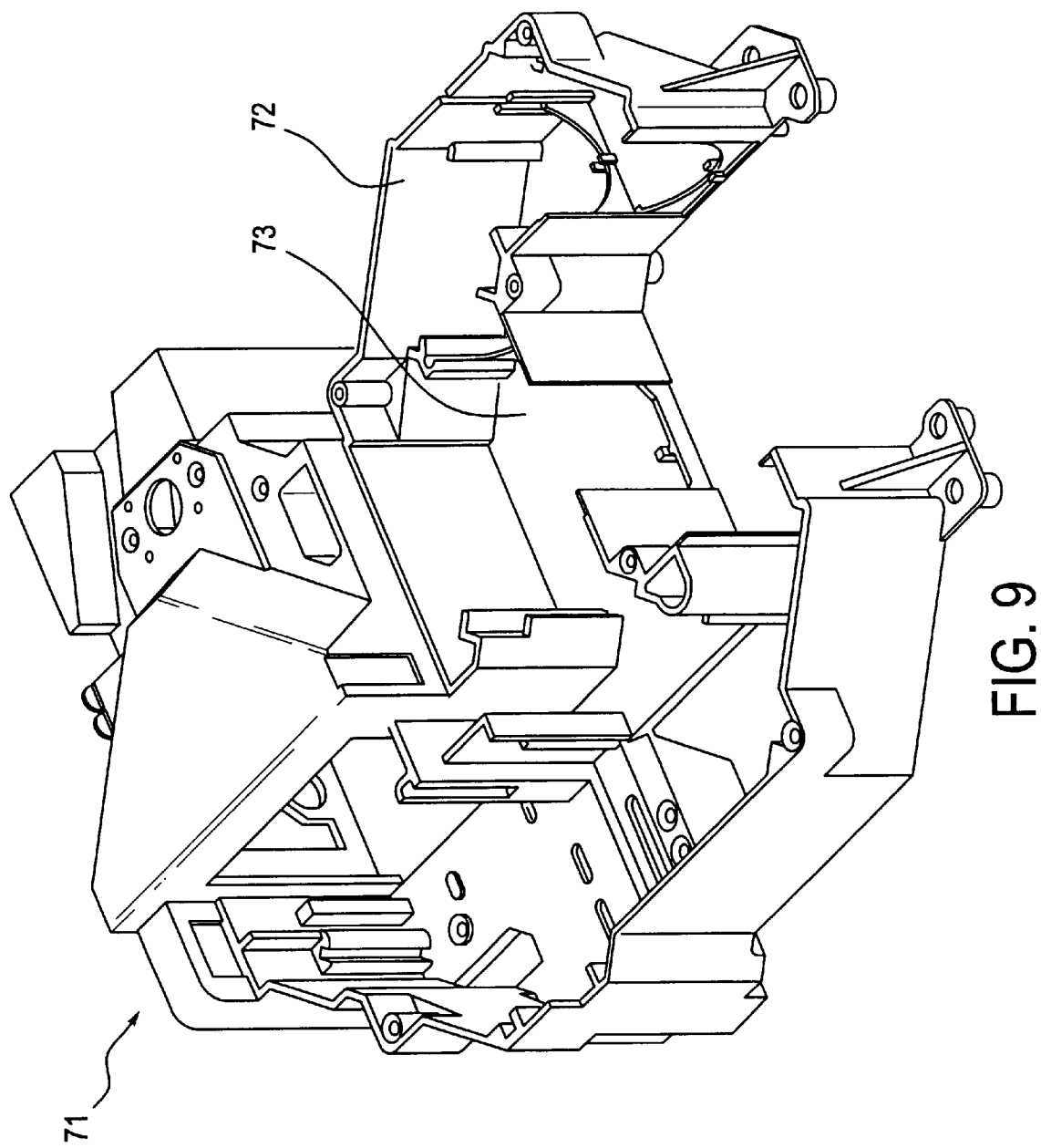
FIG. 9 is a schematic perspective view of a lower light guide that forms the optical component housing for constituting the projection display device of the embodiment.
Figure 10:
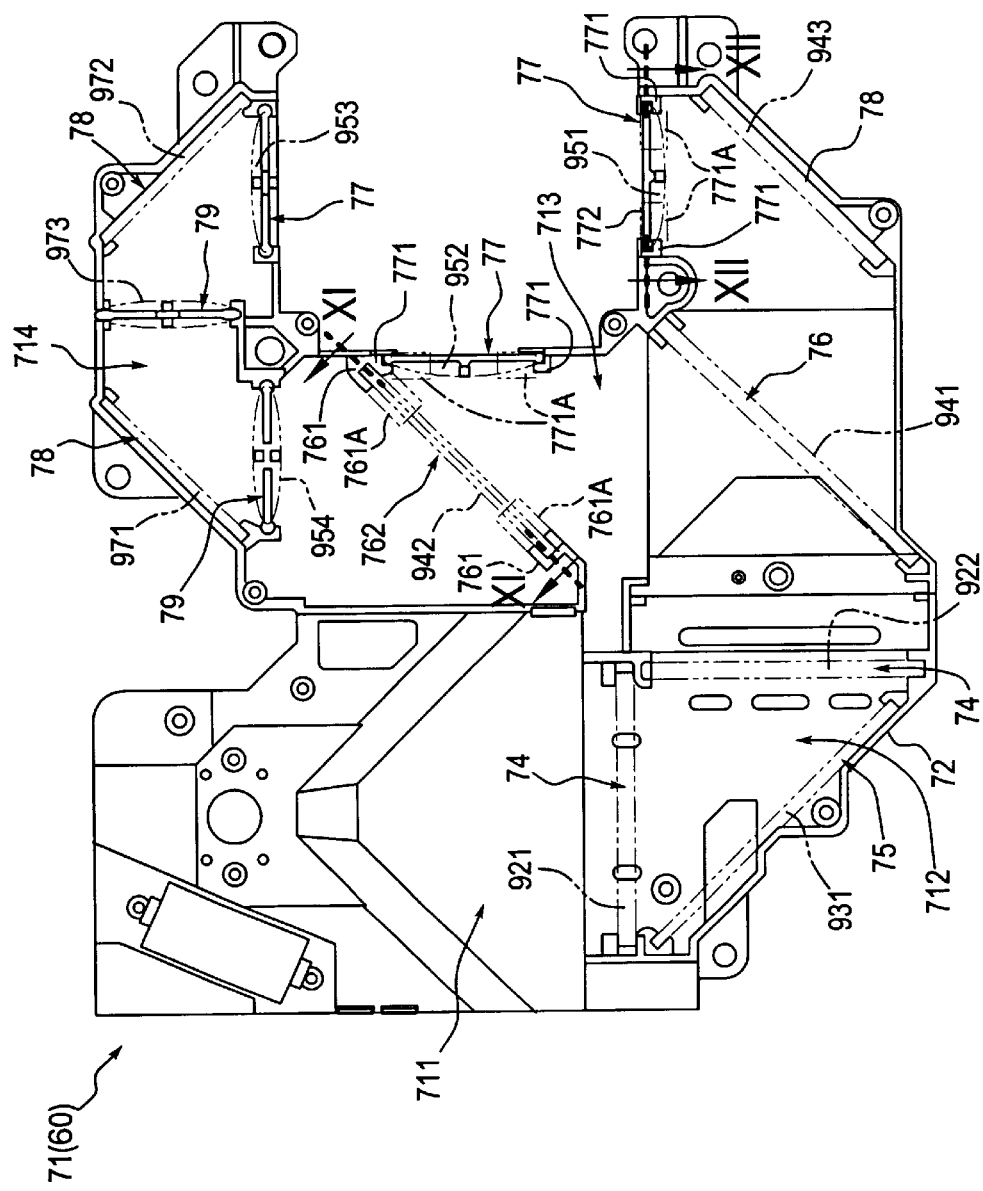
FIG. 10 is a plan view of the upper light guide that forms the optical component housing for constituting the projection display device of the embodiment.

As shown in FIGS. 9 and 10, the lower light guide 71 is a concave case formed by side plates 72 and 73 that form a predetermined angle and surround the sides and the bottoms of the optical components, and includes optical component positioning portions 74 to 79 for positioning the optical components such as the lens plates 921 and 922. The inside of the lower light guide 71 is divided into a lamp housing section 711 where the light-source lamp unit 8 is contained, an illumination optical system mounting section 712 where the illumination optical system 923 is placed, a color separation optical system mounting section 713 where the color separation optical system 924 is placed, and a light guide system mounting section 714 where the light guide system 927 is placed.

The illumination optical system mounting section 712 includes optical component positioning portions 74 for positioning the first lens plate 921 and the second lens plate 922 described above, and an optical component positioning portion 75 for positioning the reflecting mirror 931 along the side plate 72. The color separation optical system mounting section 713 includes optical component positioning portions 76 for positioning the blue and green reflecting dichroic mirror 941 and the green reflecting dichroic mirror 942, optical component positioning portions 77 for positioning the condenser lenses 951 and 952, and an optical component positioning portion 78 for positioning the reflecting mirror 943. The light guide system mounting section 714 includes optical component positioning portions 78 for positioning the reflecting mirrors 971 and 972, an optical component positioning portion 77 for positioning the condenser lens 953, and optical component positioning portions 79 for positioning the condenser lens 954 and the intermediate lens 973.

Such optical component positioning portions 74 to 79 define the placement of the optical components in the optical path, that is, the advanced and retracted positions along the optical path and the inclination with respect to the optical path.

Figure 11:
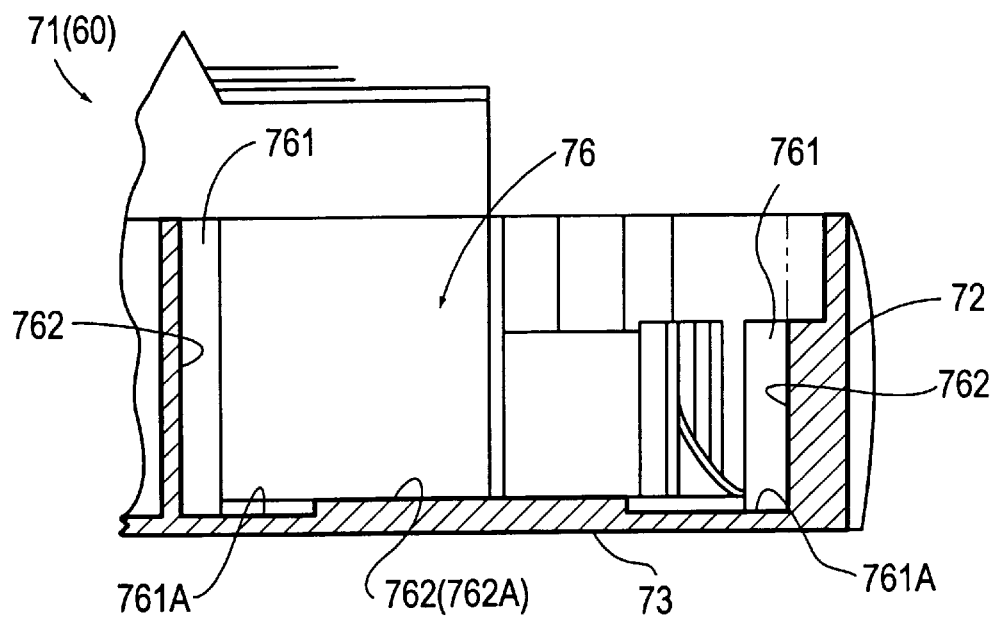
FIG. 11 is a sectional view taken along line XI—XI in FIG. 10.
Figure 12:
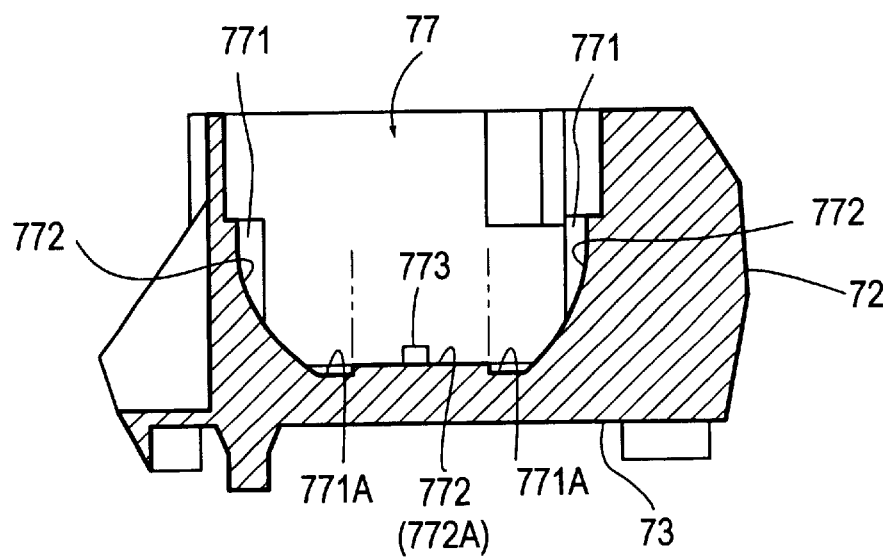
FIG. 12 is a sectional view taken along line XII—XII in FIG. 10.

The details thereof are shown in FIGS. 11 and 12. FIG. 11 is a sectional view taken along line XI—XI in FIG. 10, and FIG. 12 is a sectional view taken along line XII—XII in FIG. 10.

As is evident from FIGS. 11 and 12, the optical component positioning portions 76 for positioning the dichroic mirrors 941 and 942 have first support portions 761 for supporting the light incident surfaces or the light emitting surfaces of the dichroic mirrors 941 and 942, and second support portions 762 for supporting the peripheral edges of the dichroic mirrors 941 and 942.

The first support portions 761 project from the inner side face of the first side plate 72 of the lower light guide 71. The second support portions 762 are formed by a part of the inner side faces of the side plates 72 and 73 of the lower light guide 71. By putting the dichroic mirrors 941 and 942 between the first support portions 761 for supporting the light incident surfaces and the first support portions 761 for supporting the light emitting surfaces so that the peripheral edges of the dichroic mirrors 941 and 942 abut on the second support portions 762, the placement of the dichroic mirrors 941 and 942 in the optical path is defined.

Recesses 761A are formed in portions of the inner side face of the second side plate 73 in contact with the first support portions 761, and are depressed more deeply than a portion 762A that forms the second support portion 762. The optical component positioning portions 74, 75, and 78 for positioning other plate-like optical components may also have a structure similar to that of the optical component positioning portions 76.

As is evident from FIGS. 10 and 12, the optical component positioning portions 77 for positioning the condenser lenses 951, 952, and 953 include first support portions 771 for supporting the light incident surfaces and the light emitting surfaces of the condenser lenses 951, 952, and 953, and second support portions 772 for supporting the peripheral edges of the condenser lenses 951, 952, and 953.

The first support portions 771 project from the inner side face of the first side plate 72 of the lower light guide 71. The second support portions 772 are formed by a part of the inner side faces of the side plates 72 and 73 of the lower light guide 71. By putting the condenser lenses 951, 952, and 953 between the first support portions 771 for supporting the light incident surfaces and the second support portions 772 for supporting the light emitting surfaces so that the peripheral edges thereof abut on the second support portions 772, the positions of the condenser lenses 951, 952, and 953 in the optical path are defined.

Recesses 771A are formed in portions of the inner side face of the second side plate 73 in contact with the first support portions 771, and are depressed more deeply than a portion 772A for constituting the second support portion 772.

Third support portions 773 project from the inner side face of the second side plate 73 of the lower light guide 71, and support the light incident surfaces or the light emitting surfaces of the condenser lenses 951, 952, and 953 together with the first support portions 771, thereby preventing rattling. In a case in which the surfaces in contact with the first support portions 771 are not planar, as in the condenser lenses 951, 952, and 953, the third support portions 773 are provided on the second side plate 73, which differs from the first side plate 72 having the first support portions 771 formed thereon, which makes it possible to more precisely position the condenser lenses 951, 952, and 953. The optical component positioning portions 79 for positioning other lens-like optical components have a structure similar to that of the optical component positioning portions 77.

The upper light guide 61 and the lower light guide 71 having the above-described structures are each an integral part molded of a magnesium alloy by thixomolding. More specifically, the lower light guide 71 is molded by the following process.

A cavity is formed by a casting mold so as to conform to the placement and shapes of the first side plate 72, the second side plate 73, and the optical component positioning portions 74 to 79 that constitute the lower light guide 71. In the above-described optical component positioning portions 76, inserts having a cross section parallel to the second side plate 73, which approximately coincides with the planar shape of the recesses 761A, are fitted in the portions of the inner side face of the second side plate 73 in contact with the first support portions 761 so as to form the recesses 761A thereat. Similarly, in the above-described optical component positioning portions 77, inserts having a cross section parallel to the second side plate 73, which approximately coincides with the planar shape of the recess 771A, are fitted in the portions of the second side plate 73 in contact with the first support portions 771 so as to form the recesses 771A thereat. That is, the recesses 761A and 771A are formed as previously removed portions from the previously removed inserts.

A magnesium alloy slurry is injected from a gate of the casting mold with a predetermined pressure, is solidified by cooling, and is removed from the mold. In this case, a previously removed plate having a previously removed insert is removed by several millimeters in the removing direction before opening the upper mold and the lower mold, thereby overcoming clinging of the molded article to the molds at the recesses 761A and 771A described above.

Casting fins produced at the ends or other portions of the molded lower light guide 71 are removed with a grinder or the like, and the side plates 72 and 73 of the lower light guide 71 are surface-finished by buffing or by other methods.

Since the upper light guide 61 is molded by nearly the same process as above, except that inserts are not used, description thereof is omitted.

This embodiment described above provides the following advantages. That is, the recesses 761A and 771A are formed in the portions of the inner side face of the second side plate 73 of the lower light guide 71 in contact with the first support portions 761 and 771, and are depressed more deeply than the portions that constitute the second support portions 762 and 772. Since the recesses 761A and 771A serve as previously removed portions in thixomolding, it is possible to prevent interference between the first support portions 761 and 771 and the second support portions 762 and 772, and to thereby form the first support portions 761 and 771 and the second support portions 762 and 772 with high precision. Therefore, it is possible to easily and precisely form the light guide 60, and to substantially reduce the production cost thereof.

Since the recesses 761A and 771A are formed as previously removed portions by using the inserts, it is unnecessary to form a draft for demolding in the first support portions 761 and 771 projecting on the inner side face of the light guide 60, which can simplify the structure of the casting mold. Furthermore, it is easier to ensure accuracy of the first support portions 761 and 771 and the second support portions 762 and 772.

In addition, the recesses 761A and 771A are formed in the portions of the inner side face of the second side plate 73 of the lower light guide 71 in contact with the first support portions 761 and 771, and are depressed more deeply than the portions that constitute the second support portions 762 and 772. Therefore, even when casting fins and the like are produced in the portions of the first support portions 761 and 771 in contact with the second side plate 73 due to the entry of an alloy slurry between the inserts and the casting mold, the casting fins can be absorbed by the recesses 761A and 771A, which can simplify operations of, for example, removing the casting fins. Consequently, it is possible to further reduce the production cost of the light guide 60.

According to the projection display device 1 having such a light guide 60, as described above, it is possible to reduce the production cost, to improve accuracy of placement of the optical components, to improve cooling efficiency for the optical components, and to reduce the weight of the projection display device 1 associated with weight reduction of the light guide 60.

With reduction in size and weight of the projection display device 1, portability thereof is improved, and this requires attention to be paid to impact resistance of the projection display device and the like. When the light guide 60 has such a structure, it protects the optical components housed therein with sufficient strength, which is advantageous for impact resistance.

Furthermore, since the light guide 60 has such a structure, it is possible to increase grounding of the circuit board 80 and the like placed on the upper light guide 61, and to thereby improve EMI performance.

The present invention is not limited to the above embodiment, and includes the following modifications.

While the optical component positioning portions 74 to 79 and other portions of the lower light guide 71 are integrally formed in the above embodiment, the present invention is not limited to this. That is, the light guide may be constructed by forming only the optical component positioning portions 74 to 79 by thixomolding, and by attaching plate-like members thereto by screws or the like. In this case, the optical component positioning portions constitute a part of the side plates 72 and 73 of the light guide 60. Furthermore, the optical component positioning portions formed by thixomolding may be mounted on the inner face of a box-shaped member. In this case, it is satisfactory as long as the optical component positioning portions have structures corresponding to those of the side plates 72 and 73. By constructing the light guide in this way, it is possible to simplify the structure of the mold for thixomolding, to more easily ensure dimensional accuracy of the optical component positioning portions, and to further reduce the production cost of the light guide.

While the light guide 60 is made of a magnesium alloy in the above embodiment, the present invention is available even when the light guide 60 is made of other metals, as long as the metals permit thixomolding. More specifically, aluminum, zinc, titanium, and the like may be adopted as the metal for forming the light guide.

The structure of the light guide 60 is not limited to the structure of the above embodiment that includes the lower light guide 71 formed of a concave case and the upper light guide 61 formed of a top plate. That is, the light guide 60 may be composed of right and left light guides. Furthermore, it may be possible to form upper and lower or right and left light guides of concave cases, and to provide the above-described optical component positioning portions in the light guides.

Figure 13A:
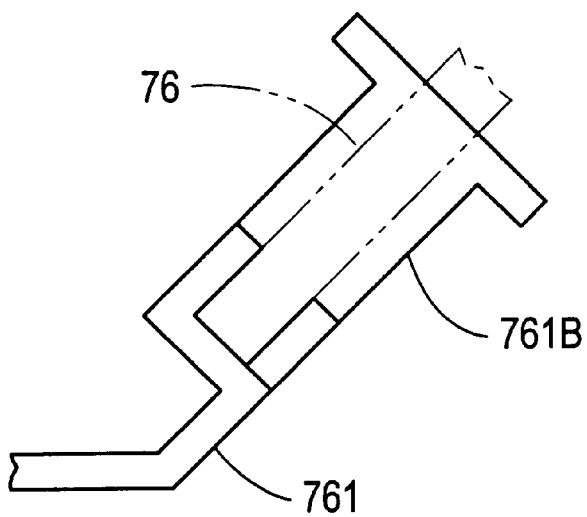
FIGS. 13(A) and (B) are partial plan views showing the planar shapes of a recess in modifications of the above-described embodiment.
Figure 13B:
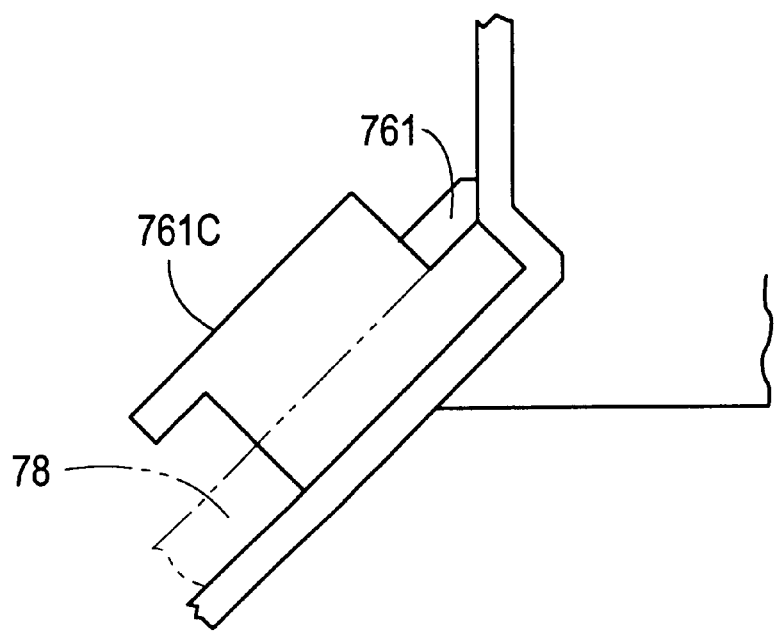

While the above-described recesses 761A and 771A are depressed in an approximately rectangular shape in plan view, recesses formed in the first support portions 761 in the optical component positioning portions 76 shown in FIG. 10 may be replaced with recesses 761B in an approximately T-shape in plan view, as shown in FIG. 13(A). Furthermore, recesses formed in the first support portions in the optical component positioning portions 78 shown in FIG. 10 may be replaced with concave recesses 761C in an approximately L-shape in plan view, as shown in FIG. 13(B). In short, the planar shape of the recesses may be appropriately set, for example, as a cross-shape, a T-shape, or an L-shape, in accordance with the shapes of the first support portions, the second side plate, and the like. When the recesses are formed like the recesses 761B and 761C described above, since inserts can be engaged with the casting mold, they are not tilted and distorted during molding due to the pressure of molten metal, which improves and stabilizes the accuracy of thixomolding.

While the light guide 60 is adopted in the projection display device 1 having the three liquid crystal panels 925R, 925G, and 925B as optical modulation elements, in the above embodiment, the present invention may be applied to an image display device using other optical modulation elements. In short, the present invention can be applied to an image display device having a structure in which optical components, such as lenses and mirrors, must be positioned with high precision.

Other specific structures, shapes, and the like for carrying out the present invention may be replaced with other structures and the like as long as the object of the present invention can be achieved.

According to the above-described optical component housing of the present invention, since the optical component positioning portions include portions previously removed, which are formed using inserts, and the previously removed portions are formed before the upper die and the lower mold are opened, it is possible to prevent the positioning portions from clinging to the mold, and to give the optical component housing a structure that is easy to form and that can easily ensure dimensional accuracy. Furthermore, according to the projection display device of the present invention, since the device has the above-described optical component housing, it is possible to reduce the production cost thereof.

What is claimed is:

1. An optical component housing formed by thixomolding using a metal material, and having an optical component positioning portion, said optical component positioning portion comprising:
a first side plate and a second side plate that form a predetermined angle;
a first support portion that supports one of a light incident surface and a light emitting surface of said optical component; and
a second support portion that supports a peripheral edge portion of said optical component, said first support portion projecting on an inner side face of said first side plate so as to be in contact with said second side plate, and a portion of said second side plate in contact with said first support portion having a portion previously removed that is formed by inserting an insert in a mold used in the thixomolding.

2. The optical component housing according to claim 1, said previously removed portion comprising a recess formed in said second side plate.

3. The optical component housing according to claim 2, a planar shape of said recess being at least one of a substantially cross-shape, a substantially T-shape, a substantially L-shape, a substantially concave shape, and a substantially convex shape, or a combination thereof.

4. The optical component housing according to claim 1, further comprising a plate-like member attached to said optical component positioning portion.

5. The optical component housing according to claim 1, said optical component positioning portion being mounted inside a box-shaped member.

6. A projector having an optical component housing formed by thixomolding using a metal material, said optical component housing having an optical component positioning portion, said optical component positioning portion comprising:
a first side plate and a second side plate that form a predetermined angle;
a first support portion that supports one of a light incident surface and a light emitting surface of said optical component; and
a second support portion that supports a peripheral edge portion of said optical component, said first support portion projecting on an inner side face of said first side plate so as to be in contact with said second side plate, and a portion of said second side plate in contact with said first support portion having a portion previously removed that is formed by inserting an insert in a mold used in the thixomolding.

7. The projector according to claim 6, said previously removed portion comprising a recess formed in said second side plate.

8. The projector according to claim 7, a planar shape of said recess being at least one of a substantially cross-shape, a substantially T-shape, a substantially L-shape, a substantially concave shape, and a substantially convex shape, or a combination thereof.

9. The projector according to claim 6, further comprising a plate-like member attached to said optical component positioning portion.

10. The projector according to claim 6, said optical component positioning portion being mounted inside a box-shaped member.

11. An optical component housing formed by thixomolding using a metal material, and having an optical component positioning portion, said optical component positioning portion comprising:
a first side plate and a second side plate that form a predetermined angle;
a first support portion that supports one of a light incident surface and the light emitting surface of said optical component; and
a second support portion that supports a peripheral edge portion of said optical component, said first support portion projecting on an inner side face of said first side plate so as to be in contact with said second side plate, and a portion of said second side plate in contact with said first support portion having a recess.

12. The optical component housing according to claim 11, a planar shape of said recess being at least one of a substantially cross-shape, a substantially T-shape, a substantially L-shape, a substantially concave shape, and a substantially convex shape, or a combination thereof.

13. The optical component housing according to claim 11, further comprising a plate-like member attached to said optical component positioning portion.

14. The optical component housing according to claim 11, further comprising said optical component positioning portion being mounted inside a box-shaped member.

15. A projection display device having an optical component housing formed by thixomolding using a metal material, said optical component housing having an optical component positioning portion, said optical component positioning portion comprising:

a first side plate and a second side plate that form a predetermined angle;

a first support portion that supports one of a light incident surface and a light emitting surface of said optical component; and a second support portion that supports a peripheral edge portion of said optical component, said first support portion projecting on an inner side face of said first side plate so as to be in contact with said second side plate, and a portion of said second side plate in contact with said first support portion having a recess.

16. The projector according to claim 15, a planar shape of said recess being at least one of a substantially cross-shape, a substantially T-shape, a substantially L-shape, a substantially concave shape, and a substantially convex shape, or a combination thereof.

17. The projector according to claim 15, further comprising a plate-like member attached to said optical component positioning portion.

18. The projector according to claim 15, said optical component positioning portion being mounted inside a box-shaped member.

* * * * *